United States Patent
Chen (10) Patent No.: US 9,477,436 B2
(45) Date of Patent: Oct. 25, 2016

(54) INTERACTIVE DISPLAY SYSTEM, OPERATION METHOD THEREOF, AND IMAGE INTERMEDIARY APPARATUS

(71) Applicant: Coretronic Corporation, Hsin-Chu (TW)

(72) Inventor: Yung-Chih Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 14/814,519

(22) Filed: Jul. 31, 2015

(65) Prior Publication Data
US 2016/0188274 A1    Jun. 30, 2016

(30) Foreign Application Priority Data

Dec. 31, 2014   (CN) .......................... 2014 1 0849003

(51) Int. Cl.
    *G09G 5/00*    (2006.01)
    *G06F 3/14*    (2006.01)
    *G09G 5/12*    (2006.01)

(52) U.S. Cl.
    CPC ............. *G06F 3/1423* (2013.01); *G09G 5/12* (2013.01); *G09G 2340/0407* (2013.01); *G09G 2340/0464* (2013.01); *G09G 2370/20* (2013.01)

(58) Field of Classification Search
    CPC ...... G06F 3/147; G06F 3/1423; G06Q 30/02
    USPC .................... 345/2.1–2.3, 156–158; 709/204
    See application file for complete search history.

(56) References Cited

U.S. PATENT DOCUMENTS

| | | | |
|---|---|---|---|
| 6,940,528 B2 | 9/2005 | Fukui et al. | |
| 8,847,739 B2 * | 9/2014 | Wilson | G06F 3/046 340/10.1 |
| 2004/0041989 A1 | 3/2004 | Olson et al. | |
| 2007/0266094 A1 | 11/2007 | Chang et al. | |
| 2010/0164863 A1 * | 7/2010 | Tunick | G06F 3/147 345/156 |
| 2011/0181507 A1 * | 7/2011 | Oakley | G06F 3/03545 345/157 |
| 2014/0359482 A1 * | 12/2014 | Sinn | G06F 3/048 715/753 |
| 2015/0070263 A1 * | 3/2015 | Murillo | G06F 3/011 345/156 |

(Continued)

FOREIGN PATENT DOCUMENTS

| | | |
|---|---|---|
| CN | 1833196 | 9/2006 |
| TW | I307588 | 3/2009 |
| TW | 201400970 | 1/2014 |

*Primary Examiner* — Kimnhung Nguyen
(74) *Attorney, Agent, or Firm* — Jianq Chyun IP Office (57) ABSTRACT

An interactive display system, an operation method thereof, and an image intermediary apparatus are provided. The image intermediary apparatus is adapted to at least divide a display area of an interactive display apparatus into a first frame region and identify external electronic apparatuses to establish a correspondence relation between the external electronic apparatuses and image signals of the external electronic apparatuses, and display a first image based on a first image signal among the image signals of the external electronic apparatuses on the first frame region. When interactive position information indicates that an interactive event occurs on the first frame region, the image intermediary apparatus acquires a communication identification information corresponding to the first image signal according to the correspondence relation, and transmits a coordinate corresponding to the interactive position information to an external electronic apparatus corresponding to the communication identification information among the external electronic apparatuses.

29 Claims, 4 Drawing Sheets

(56) References Cited

U.S. PATENT DOCUMENTS

2015/0177940 A1* 6/2015 Trevino ................. H04L 67/08
715/716

2015/0379478 A1* 12/2015 Klemm .............. G06Q 10/1095
705/7.19
2016/0188181 A1* 6/2016 Smith ..................... G06F 3/048
715/765

* cited by examiner

INTERACTIVE DISPLAY SYSTEM, OPERATION METHOD THEREOF, AND IMAGE INTERMEDIARY APPARATUS

CROSS-REFERENCE TO RELATED APPLICATION

This application claims the priority benefit of China application serial no. 201410849003.2, filed on Dec. 31, 2014. The entirety of the above-mentioned patent application is hereby incorporated by reference herein and made a part of this specification.

BACKGROUND OF THE INVENTION

1. Field of the Invention

The invention relates to a display system, and more particularly, relates to an interactive display system, an operation method thereof and an image intermediary apparatus.

2. Description of Related Art

In all types of meeting, a speaker can share knowledge, experience or work content with audience through speech which often accompanies with a presentation provided by the speaker. With advancement in electronic technologies, it is common to play the presentation by using a projector or a display apparatus (e.g., a liquid crystal display (LCD)).

In general, the speaker may directly connect a computer system (e.g., a notebook computer) to the projector or the display apparatus through a transmission cable, so that an image displayed on the screen of the computer system may be projected on a projection screen or a wall by the projector or displayed by another display apparatus. However, this kind of wired connection is usually constrained by a length of the transmission cable. For example, the speaker may need to place the notebook computer near the projector in order to facilitate the connection. Moreover, the wired connection may cause trouble when switching between image signals. For example, when there are multiple speakers presenting in one meeting or when image data to be played are from other notebook computers, the speaker needs to unplug the transmission cable from the current connected notebook computer before connecting the transmission cable to another notebook computer. Accordingly, it is necessary to develop a new image intermediary apparatus and a new interactive display system.

Patents or patent application publications related to the interactive display system may include: Taiwan Patent No. TW 1307588, Taiwan Patent Application Publication No. TW 201400970, China Patent Application Publication No. CN 1833196A, and U.S. Pat. No. 6,940,528.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides an interactive display system, an operation method thereof, and an image intermediary apparatus, which are capable of improving convenience for users to conduct operation of image output.

Other objects and advantages of the invention can be further illustrated by the technical features broadly embodied and described as follows.

In order to achieve one, a part, or all of the objects or other objects, an embodiment of the invention provides an interactive display system, which is configured to receive different image signals from a plurality of external electronic apparatuses and display corresponding images. The interactive display system includes an interactive display apparatus and an image intermediary apparatus. The interactive display apparatus has a display area and is configured to sense an interactive event within the display area in order to acquire interactive position information. The image intermediary apparatus is coupled to interactive display apparatus via a first wireless channel in order to receive the interactive position information. The image intermediary apparatus is adapted to at least divide the display area into a first frame region and identify external electronic apparatuses in order to establish a correspondence relation between the external electronic apparatuses and image signals of the external electronic apparatuses, and display a first image based on a first image signal among the image signals of the external electronic apparatuses on the first frame region. The image intermediary apparatus is adapted to acquire first communication identification information corresponding to the first image signal according to the correspondence relation and transmit a coordinate corresponding to the interactive position information to a first external electronic apparatus corresponding to the first communication identification information among the external electronic apparatuses when the interactive position information indicates that the interactive event occurs on the first frame region.

According to an embodiment of the invention, the interactive display apparatus further comprises an interactive projection screen and a projector. The interactive projection screen has the display area, and the projector is configured to project the first image corresponding to the first image signal among the image signals of the external electronic apparatuses on the first frame region of the display area of the interactive projection screen. The interactive display apparatus is configured to sense the interactive event within the display area and acquire the interactive position information.

According to an embodiment of the invention, the first external electronic apparatus is adapted to transmit the first image signal to the image intermediary apparatus via a first image transmission channel, and the image intermediary apparatus is adapted to transmit the coordinate to the first external electronic apparatus by using the first communication identification information via a second wireless channel different from the first image transmission channel.

According to an embodiment of the invention, the image intermediary apparatus is adapted to transmit first image identification data to the first external electronic apparatus via the first image transmission channel and receive a plurality of packets transmitted back from the first external electronic apparatus via the second wireless channel. At least one of the packets contains the first communication identification information of the first external electronic apparatus and the first image identification data received by the first external electronic apparatus. The image intermediary apparatus is adapted to record the first communication identification information and the first image identification data into the correspondence relation.

According to an embodiment of the invention, the image intermediary apparatus is configured to divide the display area into the first frame region and a second frame region and display the first image based on the first image signal and a second image based on a second image signal among the image signals of the external electronic apparatuses on the first frame region and the second frame region of the interactive display apparatus, respectively. The image intermediary apparatus is adapted to acquire second communication identification information corresponding to the second image signal according to the correspondence relation and transmit the coordinate corresponding to the interactive position information to a second external electronic apparatus corresponding to the second communication identification information among the external electronic apparatuses when the interactive position information indicates that the interactive event occurs on the second frame region.

According to an embodiment of the invention, the second external electronic apparatus is adapted to transmit the second image signal to the image intermediary apparatus via a second image transmission channel, and the image intermediary apparatus is adapted to transmit the coordinate to the second external electronic apparatus by using the second communication identification information via the second wireless channel when the interactive position information indicates that the interactive event occurs on the second frame region.

According to an embodiment of the invention, the image intermediary apparatus is adapted to transmit second image identification data to the second external electronic apparatus via the second image transmission channel and receive a plurality of packets transmitted back from the second external electronic apparatus via the second wireless channel. At least one of the packets contains the second communication identification information of the second external electronic apparatus and the second image identification data received by the second external electronic apparatus, and the image intermediary apparatus is adapted to record the second communication identification information and the second image identification data into the correspondence relation.

According to an embodiment of the invention, the first image transmission channel includes a first image transmission cable, the second image transmission channel includes a second image transmission cable, the first wireless channel includes a first wireless local area network, and the second wireless channel includes a second wireless local area network.

According to an embodiment of the invention, the first image identification data includes a machine name field and a resolution field, and the second image identification data includes another machine name field and another resolution field. The machine name fields record machine names of the external electronic apparatuses, and the resolution fields record resolution information of the external electronic apparatuses.

According to an embodiment of the invention, the image intermediary apparatus is adapted to convert the coordinate according to the resolution information and transmit the converted coordinate to the first external electronic apparatus or the second external electronic apparatus based on the interactive position information.

In order to achieve one, a part, or all of the objects or other objects, an embodiment of the invention provides an operation method of an interactive display system. The interactive display system includes an interactive display apparatus and an image intermediary apparatus. The operation method includes: receiving different image signals from a plurality of external electronic apparatuses and identifying the external electronic apparatuses by the image intermediary apparatus in order to establish a correspondence relation between the external electronic apparatuses and the image signals of the external electronic apparatuses; at least dividing a display area of the interactive display apparatus into a first frame region by the image intermediary apparatus; displaying a first image based on a first image signal among the image signals of the external electronic apparatuses on the first frame region by the image intermediary apparatus; sensing an interactive event within the display area by the interactive display apparatus in order to acquire interactive position information; transmitting the interactive position information to the image intermediary apparatus via a first wireless channel by the interactive display apparatus; when the interactive position information indicates that the interactive event occurs on the first frame region, acquiring first communication identification information corresponding to the first image signal by the image intermediary apparatus according to the correspondence relation; and transmitting a coordinate corresponding to the interactive position information to a first external electronic apparatus corresponding to the first communication identification information among the external electronic apparatuses by the image intermediary apparatus.

According to an embodiment of the invention, the interactive display apparatus is configured to sense the interactive event within the display area and acquire the interactive position information and comprises an interactive projection screen and a projector. The interactive projection screen has the display area, and the projector is configured to project the first image based on the first image signal among the image signals of the external electronic apparatuses on the first frame region of the display area of the interactive projection screen.

According to an embodiment of the invention, the first external electronic apparatus is adapted to transmit the first image signal to the image intermediary apparatus via a first image transmission channel, and the image intermediary apparatus is adapted to transmit the coordinate to the first external electronic apparatus by using the first communication identification information via a second wireless channel different from the first image transmission channel.

According to an embodiment of the invention, the step of identifying the external electronic apparatuses includes: transmitting first image identification data to the first external electronic apparatus via the first image transmission channel by the image intermediary apparatus; receiving a plurality of packets transmitted back from the first external electronic apparatus via the second wireless channel by the image intermediary apparatus, and at least one of the packets contains the first communication identification information of the first external electronic apparatus and the first image identification data received by the first external electronic apparatus; and recording the first communication identification information and the first image identification data contained by the packets into the correspondence relation by the image intermediary apparatus.

According to an embodiment of the invention, the operation method further includes: dividing the display area into the first frame region and a second frame region by the image intermediary apparatus; displaying the first image based on the first image signal and a second image based on a second image signal among the image signals of the external electronic apparatuses on the first frame region and the second frame region of the interactive display apparatus, respectively, by the image intermediary apparatus; acquiring second communication identification information corresponding to the second image signal by the image intermediary apparatus according to the correspondence relation when the interactive position information indicates that the interactive event occurs on the second frame region; and transmitting the coordinate corresponding to the interactive position information to a second external electronic apparatus corresponding to the second communication identification information among the external electronic apparatuses.

According to an embodiment of the invention, the second external electronic apparatus is adapted to transmit the second image signal to the image intermediary apparatus via a second image transmission channel, and the image intermediary apparatus is adapted to transmit the coordinate to the second external electronic apparatus by using the second communication identification information via the second wireless channel when the interactive position information indicates that the interactive event occurs on the second frame region.

According to an embodiment of the invention, the step of identifying the external electronic apparatuses further includes: transmitting second image identification data to the second external electronic apparatus via the second image transmission channel by the image intermediary apparatus; receiving a plurality of packets transmitted back from the second external electronic apparatus via the second wireless channel by the image intermediary apparatus, and at least one of the packets contains the second communication identification information of the second external electronic apparatus and the second image identification data received by the second external electronic apparatus; and recording the second communication identification information and the second image identification data contained by the packets into the correspondence relation by the image intermediary apparatus.

According to an embodiment of the invention, the first image transmission channel includes a first image transmission cable, the second image transmission channel includes a second image transmission cable, the first wireless channel includes a first wireless local area network, and the second wireless channel includes a second wireless local area network.

According to an embodiment of the invention, the first image identification data includes a machine name field and a resolution field, and the second image identification data includes another machine name field and another resolution field. The machine name fields record machine names of the external electronic apparatuses, and the resolution fields record resolution information of the external electronic apparatuses.

According to an embodiment of the invention, the operation method further includes: converting the coordinate by the image intermediary apparatus according to the resolution information, and transmitting the converted coordinate to the first external electronic apparatus or the second external electronic apparatus based on the interactive position information.

In order to achieve one, a part, or all of the objects or other objects, an embodiment of the invention provides an image intermediary apparatus. The image intermediary apparatus is configured to receive different image signals from a plurality of external electronic apparatuses and respectively display images based on the image signals of the external electronic apparatuses on an interactive display apparatus. The image intermediary apparatus includes a first communication module, a second communication module, an image input interface module, and a processing unit. The first communication module is coupled to the interactive display apparatus via a first wireless channel in order to receive interactive position information. The second communication module is coupled to the external electronic apparatuses via a second wireless channel. The image input interface module is configured to be coupled to the external electronic apparatuses respectively via a plurality of image transmission channels different from the second wireless channel in order to receive the image signals. The processing unit is coupled to the first communication module, the second communication module, and the image input interface module. The processing unit is adapted to at least divide a display area of the interactive display apparatus into a first frame region and identify the external electronic apparatuses through the image input interface module in order to establish a correspondence relation between the external electronic apparatuses and the image signals of the external electronic apparatuses, and display a first image based on a first image signal among the image signals on the first frame region of the interactive display apparatus via the first wireless channel through the first communication module. When the interactive position information indicates that an interactive event within the display area sensed by the interactive display apparatus occurs on the first frame region, the processing unit is adapted to acquire first communication identification information corresponding to the first image signal according to the correspondence relation, and transmit a coordinate corresponding to the interactive position information to a first external electronic apparatus corresponding to the first communication identification information among the external electronic apparatuses via the second wireless channel through the second communication module.

According to an embodiment of the invention, the processing unit is adapted to receive the first image signal from the first external electronic apparatus via a first image transmission channel among the image transmission channels through the image input interface module. The processing unit is adapted to transmit the coordinate to the first external electronic apparatus by using the first communication identification information via the second wireless channel different from the first image transmission channel through the second communication module.

According to an embodiment of the invention, the processing unit is adapted to transmit first image identification data to the first external electronic apparatus via the first image transmission channel through the image input interface module and receive a plurality of packets transmitted back from the first external electronic apparatus via the second wireless channel through the second communication module, and at least one of the packets contains the first communication identification information of the first external electronic apparatus and the first image identification data received by the first external electronic apparatus. The processing unit is adapted to record the first communication identification information and the first image identification data into the correspondence relation.

According to an embodiment of the invention, the processing unit is configured to divide the display area into the first frame region and a second frame region, and display the first image based on the first image signal and a second image based on a second image signal among the image signals of the external electronic apparatuses on the first frame region and the second frame region of the interactive display apparatus, respectively, via the first wireless channel through the first communication module. The processing unit is adapted to acquire second communication identification information corresponding to the second image signal according to the correspondence relation and transmit the coordinate corresponding to the interactive position information to a second external electronic apparatus corresponding to the second communication identification information among the external electronic apparatuses via the second wireless channel through the second communication module when the interactive position information indicates that the interactive event occurs on the second frame region.

According to an embodiment of the invention, the processing unit is adapted to receive the second image signal from the second external electronic apparatus via a second image transmission channel through the image input interface module. The processing unit is adapted to transmit the coordinate to the second external electronic apparatus by using the second communication identification information via the second wireless channel through the second communication module when the interactive position information indicates that the interactive event occurs on the second frame region.

According to an embodiment of the invention, the processing unit is adapted to transmit second image identification data to the second external electronic apparatus via the second image transmission channel through the image input interface module and receive a plurality of packets transmitted back from the second external electronic apparatus via the second wireless channel through the second communication module, and at least one of the packets contains the second communication identification information of the second external electronic apparatus and the second image identification data received by the second external electronic apparatus. The processing unit is adapted to record the second communication identification information and the second image identification data into the correspondence relation.

According to an embodiment of the invention, the first image transmission channel includes a first image transmission cable, the second image transmission channel includes a second image transmission cable, the first wireless channel includes a first wireless local area network, and the second wireless channel includes a second wireless local area network.

According to an embodiment of the invention, the first image identification data includes a machine name field and a resolution field, and the second image identification data comprises another machine name field and another resolution field. The machine name fields record machine names of the external electronic apparatuses, and the resolution fields record resolution information of the external electronic apparatuses.

According to an embodiment of the invention, the processing unit is adapted to convert the coordinate according to the resolution information and transmit the converted coordinate to the first external electronic apparatus or the second external electronic apparatus via the second wireless channel through the second communication module based on the interactive position information.

According to the embodiments of the invention, the image intermediary apparatus identifies the external electronic apparatuses in order to establish the correspondence relation between the external electronic apparatuses and the image signals thereof, and displays one or more images based on the corresponding image signals respectively on one or more frame regions in the display area of the interactive display apparatus. When the interactive event occurs on a specific frame region, the image intermediary apparatus may transmit the coordinate related to the interactive position information corresponding to the interactive event to the corresponding external electronic apparatus according to the correspondence relations. Accordingly, when the presentation is to be presented by multiple users, the interactive display apparatus is capable of displaying the presentation from one or more users and providing them interactions for interactive operations without complex operations of switching between the users. Furthermore, in the embodiments of the invention, the image intermediary apparatus is further used to transmit/receive the image signals and the interactive position information via the wireless channels, so as to solve the issue caused by the restriction of the transmission cables through the wireless transmission.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numerals are used in the drawings and the description to refer to the same or similar parts.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
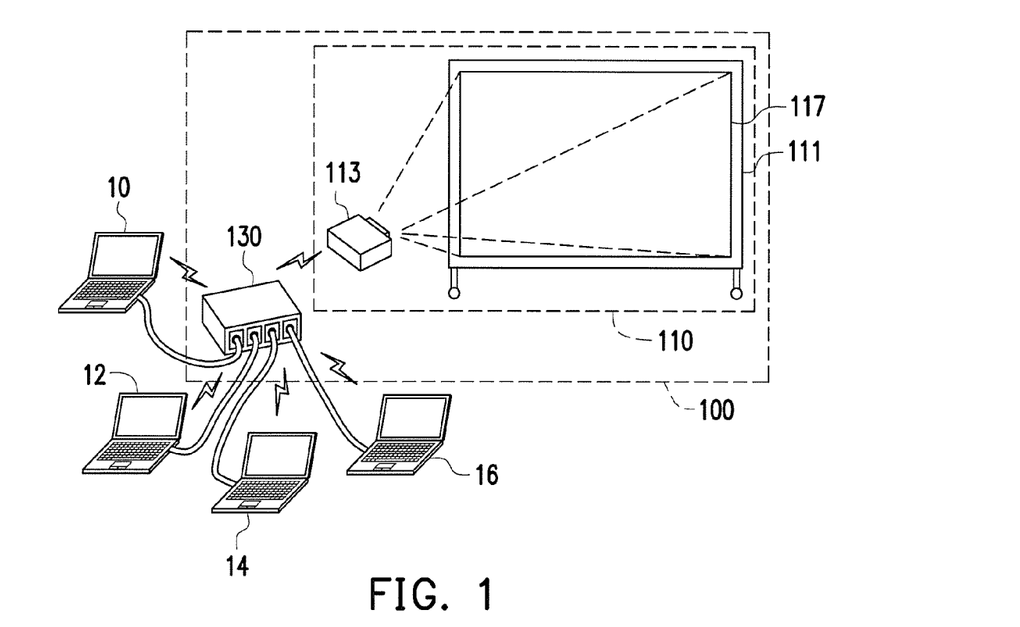
FIG. 1 is a schematic diagram illustrating an interactive display system according to an embodiment of the invention.

FIG. 1 is a schematic diagram illustrating an interactive display system 100 according to an embodiment of the invention. The interactive display system 100 includes an interactive display apparatus 110 and an image intermediary apparatus 130. The interactive display system 100 is configured to receive different image signals (e.g., video stream, etc.) from a plurality of external electronic apparatuses and display or projector the corresponding images. FIG. 1 illustrates four external electronic apparatus 10, 12, 14, and 16 as an example, but the number thereof is not limited thereto. The external electronic apparatuses may be, for example, notebook computers, desktop computers, or other suitable electronic apparatuses. Detailed steps for receiving the image signals and projecting the corresponding images will be described later in the following embodiments.

In one embodiment, the interactive display apparatus 110 may adopt an optical image type (or known as an image identification type) interactive detection technology, and may include an interactive projection screen 111 and a projector 113. The interactive projection screen 111 has a display area 117. In one embodiment, the interactive projection screen 111 is capable of sensing an interactive event within the display area 117, so as to acquire interactive position information (e.g., a coordinate corresponding to an interactive position). The interactive event, for example, may be one or more actions including clicking, sliding, dragging, double clicking, pressing and holding, which are performed on the interactive projection screen 111 by operating objects such as user's finger, a stylus, or an infrared pen. In other embodiments, the interactive event may be sensed by a cam-coder or a camera having a light sensing element such as a charge-coupled device (CCD) or a complementary metal-oxide-semiconductor (CMOS) disposed on or adjacent to the projector 113 or on or adjacent to the interactive projection screen 111.

Based on different design requirements, the projector 113 may be a digital light processing (DLP) projector, a liquid crystal on silicon (LCoS) projector, a liquid crystal display (LCD) projector, or a projector using a light valve of other types. The projector 113 is configured to project images on the display area 117 of the interactive projection screen 111 based on the image signals transmitted by the image intermediary apparatus 130. Detailed steps will be described later in the following embodiments.

In other embodiments, the projector 113 may also include an image capturing unit (not shown). The image capturing unit can be a cam-coder or a camera having a light sensing element, such as a charge-coupled device (CCD) or a complementary metal-oxide-semiconductor (CMOS)), to capture an image of the display area 117 of the interactive projection screen 111 and calculate, by using an suitable algorithm such as triangulation, the interactive position information corresponding to the interactive event on interactive projection screen 111 according to the captured image.

In other embodiments, the interactive display apparatus 110 may be a display apparatus (e.g., a computer screen, a monitor, a televisions, etc.) with one of the touch technologies including capacitive type, resistive type and optical type, and has a specific interactive area so that a user may operate on the interactive area. Further, the interactive display apparatus 110 senses the interactive event of the operating object through a physical interactive surface of the interactive display apparatus 110 in order to acquire the interactive position information.

Figure 2:
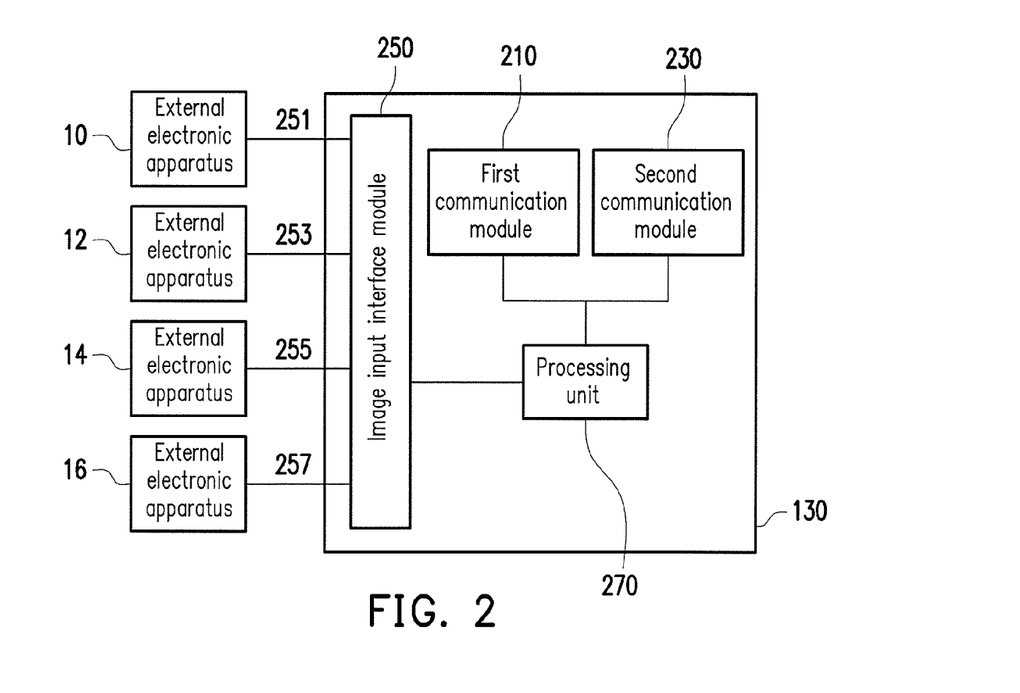
FIG. 2 is a block diagram illustrating a circuitry of the image intermediary apparatus according to an embodiment of the invention.

FIG. 2 is a block diagram illustrating a circuitry of the image intermediary apparatus 130 according to an embodiment of the invention. The image intermediary apparatus 130 may include a first communication module 210, a second communication module 230, an image input interface module 250, and a processing unit 270.

Based on different design requirements, the first communication module 210 and the second communication module 230 may be a wireless communication module supporting Wireless Fidelity (Wi-Fi) communication protocol, or a communication interface circuit supporting other wireless communication protocols (e.g., Bluetooth, 3G or 4G networks, etc.). The first communication module 210 and the second communication module 230 may serve as access points (AP) to establish a first wireless channel and a second wireless channel (which are not illustrated), respectively. The first communication module 210 may be coupled to the interactive display apparatus 110 via the first wireless channel in order to receive the interactive position information, and the second communication module 230 may be coupled to the external electronic apparatus 10 to 16 via the second wireless channel. In one embodiment, the first wireless channel includes, for example, a first wireless local area network (LAN), and the second wireless channel includes, for example, a second wireless local area network. The first wireless local area network and the second wireless local area network may be the same or different. The first communication module 210 and the second communication module 230 are, for example, provided to the interactive display apparatus 110 and the external electronic apparatuses 10 to 16 which support the WiFi function, respectively, for wireless network access.

Based on different design requirements, the image input interface module 250 is, for example, a high definition multimedia interface (HDMI), a digital visual interface (DVI) and/or other image interfaces. The image input interface module 250 is configured to be coupled to the external electronic apparatuses 10 to 16 respectively via a plurality of image transmission channels (e.g., through one or more image interface connecting terminals located on the image intermediary apparatus 130) different from the second wireless channel in order to receive the image signals. Herein, the image transmission channels are, for example, image transmission cables 251, 253, 255 and 257 (e.g., a HDMI transmission cable or a DVI transmission cable) which support the corresponding image interface of the image input interface module 250.

The processing unit 270 is coupled to the first communication module 210, the second communication module 230, and the image input interface module 250. The processing unit 270 may be a central processing unit (CPU), a microprocessor, a microcontroller, a chip set (e.g., a Southbridge chip set), and/or other operational circuits. Firmware and/or software may be operated by the processing unit 270, where the firmware may be the basic input/output system (BIOS) or other firmware, and the software may be an operating system (OS, such as Android, iOS, Linux or other suitable operating systems), a driving program, an application program and/or other suitable software.

Figure 3:
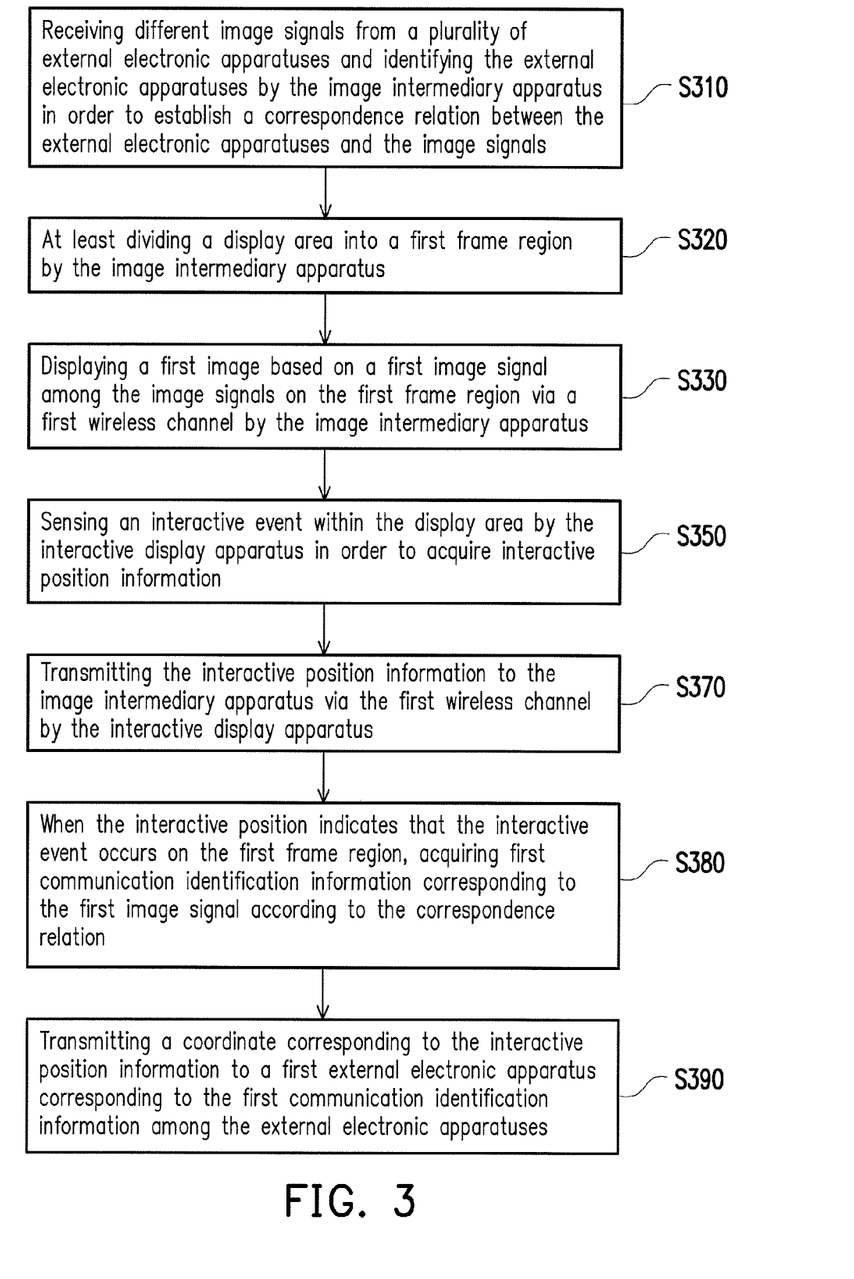
FIG. 3 is a flowchart illustrating an operation method of the interactive display system according to an embodiment of the invention.

FIG. 3 is a flowchart illustrating an operation method of the interactive display system 100 according to an embodiment of the invention. Referring to FIG. 1 to FIG. 3, the operation method of the present embodiment is suitable for the interactive display apparatus 110 and the image intermediary apparatus 130 in the interactive display system 100 of FIG. 1 as well as for the image intermediary apparatus 130 of FIG. 2. Hereinafter, various components or modules in the interactive display system 100 and the image intermediary apparatus 130 are used to describe the operation method according to the embodiments of the invention. Each step in the method may be adjusted based on actual conditions, and the invention is not limited thereto.

In step S310, the image input interface module 250 of the image intermediary apparatus 130 receives different image signals from the external electronic apparatuses 10 to 16 via a plurality of image transmission channels (e.g., the image transmission channels 251, 253, 255 and 257), and identifies the external electronic apparatuses 10 to 16 in order to establish a correspondence relation between the external electronic apparatuses 10 to 16 and the image signals of the external electronic apparatuses 10 to 16.

Figure 4:
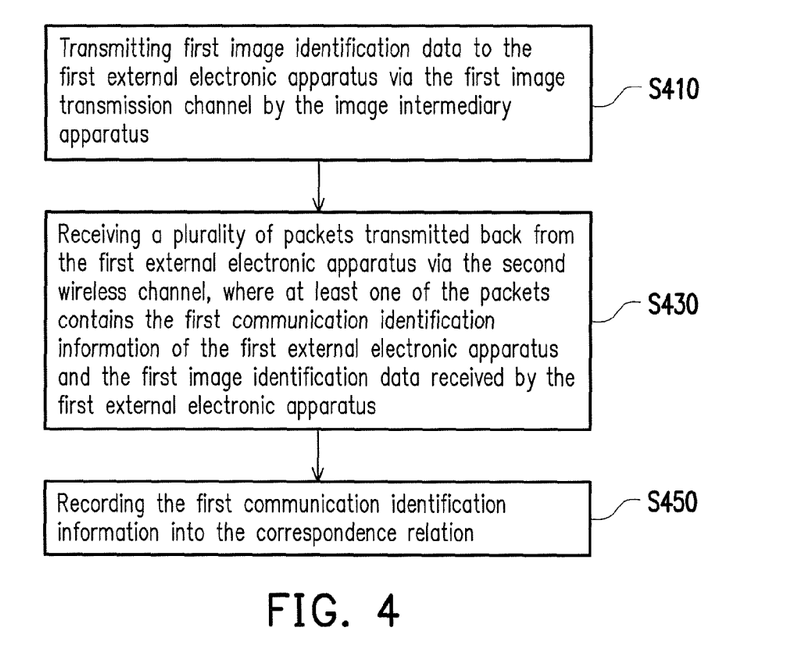
FIG. 4 is a flowchart of an operation method of the image intermediary apparatus for identifying the external electronic apparatuses according to an embodiment of the invention.

FIG. 4 is a flowchart of an operation method of the image intermediary apparatus 130 for identifying the external electronic apparatuses 10 to 16 according to an embodiment of the invention. Referring to FIG. 2 and FIG. 4, in step S410, the processing unit 270 of the image intermediary apparatus 130 transmits first image identification data (e.g., the extended display identification data; EDID) to a first external electronic apparatus (e.g., the external electronic apparatus 10) via a first image transmission channel (e.g., the image transmission cable 251) through the image input interface module 250. In other words, the image intermediary apparatus 130 transmits the first image identification data to the first external electronic apparatus via the first image transmission channel, and the first external electronic apparatus transmits a first image signal to the image intermediary apparatus 130 through the first image transmission channel. In the present embodiment, the first image identification data includes a machine name (or a machine serial number) field and a resolution field, the machine name field records a machine name of the external electronic apparatus (which is named as device 1, for example), and the resolution field records resolution information (e.g., 1080*720, 640*480, etc.) of the external electronic apparatus. In one embodiment, the machine name in the machine name field may be in the form of a symbol, a code, or a string.

Accordingly, the image intermediary apparatus 130 may use the first image identification data as a connecting terminal identification of the first external electronic apparatus. For instance, the external electronic apparatus 10 is connected to the image input interface module 250 through the image transmission cable 251. After the external electronic apparatus 10 and the image input interfaces module 250 are connected, the processing unit 270 assigns EDID-1 (corresponding to the device 1) to the external electronic apparatus 10 via the image transmission cable 251 through the image input interface module 250.

Next, in step S430, the processing unit 270 receives a plurality of packets transmitted back from the first external electronic apparatus (e.g., the external electronic device 10) via the second wireless channel through the second communication module 230, and at least one of the packets contains first communication identification information (e.g., an Internet Protocol (IP) address, a Media Access Control (MAC) address, or other specific identification information) and the first image identification data (e.g., EDID-1) received by the first external electronic apparatus.

For instance, when the external electronic apparatus 10 establishes the second wireless channel with the second communication module 230 through the WiFi function, the processing unit 270 of the image intermediary apparatus 130 assigns the IP address (e.g., 192.168.1.3) to the external electronic apparatus 10 via the second wireless channel through the second communication module 230. Subsequently, when the image intermediary apparatus 130 transmits information via the second wireless channel to request for the packets, the external electronic apparatus 10 may transmit a wireless packet including the IP address (e.g., 192.168.1.3) and the EDID (e.g., EDID-1) acquired in step S410 back to the image intermediary apparatus 130 via the second wireless channel. In other embodiments, the external electronic apparatus 10 may also directly use the MAC address of the communication module thereof as the first communication identification information to be transmitted to the image intermediary apparatus 130, and the invention does not limit to specific type of communication identification information.

Thereafter, in step S450, the processing unit 270 records the first communication identification information (e.g., the IP address, the MAC address, etc.) and the first image identification data (e.g., EDID-1) into the correspondence relation.

The processing unit 270 may, for example, record the correspondence relation into a lookup table, and the lookup table may contain a one-to-one relation of the first communication identification information and the first image identification data (e.g., the machine name and the resolution information of the external electronic apparatus are corresponding to the IP address of the external electronic apparatus).

In another embodiment, the processing unit 270 of the image intermediary apparatus 130 transmits second image identification data (e.g., EDID-2) to a second external electronic apparatus (e.g., the external electronic apparatus 12) via a second image transmission channel (e.g., the image transmission cable 253) through the image input interface module. In other words, the image intermediary apparatus 130 transmits the second image identification data to the second external electronic apparatus via the second image transmission channel, and the second external electronic apparatus transmits a second image signal to the image intermediary apparatus 130 through the second image transmission channel. Subsequently, the processing unit 270 receives a plurality of packets transmitted back from the second external electronic apparatus via the second wireless channel through the second communication module 230, and at least one of the packets contains second communication identification information (e.g., the IP address, the MAC address, etc.) and the second image identification data received by the second external electronic apparatus. The processing unit 270 records the second communication identification information and the second image identification data into the correspondence relation. Herein, the second image identification data also includes another machine name field recording a name of the second external electronic apparatus (which is named as device 2, for example) and another resolution field recording resolution information (e.g., 1920*1080, 4096*2880, etc.) of the second external electronic apparatus. Similarly, in one embodiment, the machine name in the machine name field may be in the form of a symbol, a code, or a string. Detailed steps of the present embodiment may be inferred by reference to related description in FIG. 4.

In other embodiments, after the external electronic apparatuses 10 to 16 are individually connected to the image intermediary apparatus 130 via the image transmission cables 251 to 257 respectively, the image intermediary apparatus 130 may record the image identification data (e.g., the first image identification data, the second image identification data, and so on) and the communication identification information (e.g., the first communication identification information, the second communication identification information, and so on) of the external electronic apparatuses 10 to 16 into the correspondence relation.

Referring to FIG. 1 to FIG. 3, in step S320, the processing unit 270 of the image intermediary apparatus 130 at least divides the display area 117 of the interactive display apparatus 110 into a first frame region. Subsequently, the processing unit 270 displays a first image based on the first image signal among the image signals on the first frame region of the interactive display apparatus 110 via the first wireless channel through the first communication module 210 (step S330). In the present embodiment, the processing unit 270 receives the first image signal from the first external electronic apparatus (e.g., the external electronic apparatus 10) via the first image transmission channel (e.g., the image transmission cable 251) among the image transmission channels through the image input interface module 250. The processing unit 270 may further record related information of projecting the images of the first image signal on the first frame region into a field corresponding to the first external electronic apparatus (e.g., the first communication identification information and the first image identification data) in the correspondence relation, and may further record information regarding a position, a size, a range and a coordinate of the first frame region on the display area 117. In one embodiment, taking the first external electronic apparatus (e.g. external electronic apparatus 10) as an example, the correspondence relation for the first external electronic apparatus may include the fields of the first communication identification information, the first image identification data, information of projecting images of the first image signal on the first frame region, and information regarding a position, a size, a range and a coordinate of the first frame region on the display area. All of the information may be recorded in a look up table.

For instance, the processing unit 270 of the image intermediary apparatus 130 may establish a connection with the interactive display apparatus 110 through the first communication module 210, and, through use of screen mirroring technologies such as WiFi display, AirPlay, Wireless Display (WiDi) and Miracast, synchronously display a first image based on the first image signal from the first external electronic apparatus on the interactive display apparatus 110 based on WiFi or other wireless transmission technologies and according to the resolution information in the first image identification data. The display area 117 of the interactive display apparatus 110 may then display an image on the screen of the first external electronic apparatus. In other embodiments, operation details regarding "displaying a first image based on the first image signal among the image signals on the first frame region of the interactive display apparatus 110" may refer to related operations of the known "Mirroring Technology", which are not repeated in the disclosure.

In step S350, the interactive display apparatus 110 senses the interactive event within the display area 117 in order to acquire the interactive position information, and transmits the interactive position information to the image intermediary apparatus 130 via the first wireless channel (step S370). For example, when the operating object conducts an interactive operation on the interactive projection screen 111, the image capturing unit of the interactive display apparatus 110 may capture a image on the interactive projection screen 111, and then the interactive display apparatus 110 may analyze a coordinate at location where the operating object conducts the interactive operation on the interactive projection screen 111 and transmit the coordinate as position information to the image intermediary apparatus 130. In other embodiments, operation details regarding "acquiring the interactive position information" may refer to known related operations of "detecting the position of the interactive operation by the interactive display apparatus", which are not repeated hereinafter.

In step S380, when the interactive position information indicates that the interactive event within the display area 117 sensed by the interactive display apparatus 110 occurs on the first frame region, the processing unit 270 of the image intermediary apparatus 130 acquires the first communication identification information corresponding to the first image signal having the corresponding image displayed on the first frame region according to the correspondence relation. Specifically, during the process of dividing for the first frame region by the processing unit 270 as described in step S320, because related information regarding the position of the first frame region on the display area 117 (e.g., coordinates of the range of first frame region) is also recorded, the processing unit 270 is capable of judging that the interactive event is corresponding to the first frame region according to the interactive position information. Further, because the correspondence relation records the first communication identification information and/or the first image identification data which are corresponding to the first frame region, the processing unit 270 may judge that the interactive event is also corresponding to the first communication identification information and/or the first image identification data according to the correspondence relation.

Subsequently, in step S390, the processing unit 270 of the image intermediary apparatus 130 transmits a coordinate corresponding to the interactive position information to the first external electronic apparatus (e.g., the external electronic device 10) corresponding to the first communication identification information among the external electronic apparatuses via the second wireless channel through the second communication module 230. In the present embodiment, the processing unit 270 converts the coordinate according to the resolution information and then transmits the converted coordinate to the first external electronic apparatus via the second wireless channel through the second communication module 230.

Figure 5:
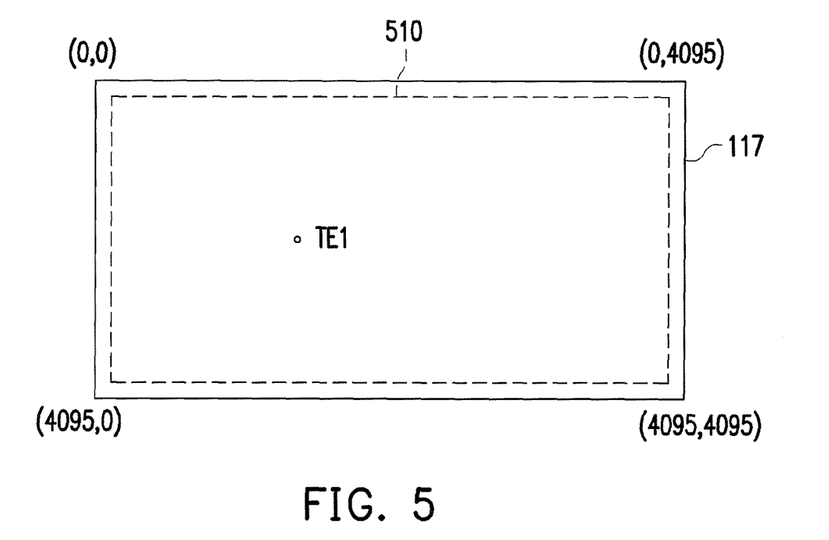
FIG. 5 is a schematic diagram of the first frame region according to an embodiment of the invention.

For instance, FIG. 5 is a schematic diagram of the first frame region according to an embodiment of the invention. Referring to FIG. 1, FIG. 2, FIG. 3 and FIG. 5, the processing unit 270 of the image intermediary apparatus 130 divides the display area 117 into a first frame region 510 in step S320. For instance, the processing unit 270 arranges the display area 117 into an area with a size of 4096*4096 pixels, and each of the pixels on the display area 117 may be converted into a coordinate point on an X-Y axis coordinate. For example, in the display area 117, it can be set that a most upper-left coordinate is (0,0), a most upper-right coordinate is (0,4095), a most lower-left coordinate is (4095,0) and a most lower-right coordinate is (4095,4095). If the resolution information in the first image identification information corresponding the first external electronic apparatus is 1920*720 while an interactive event TE1 occurs at the coordinate (2047,1027), the converted coordinate is (959, 479). It should be noted that, a geometric shape, a position and a number of the first frame region 510 depicted in FIG. 5 are merely an example, and the invention is not limited thereto. In other embodiments, the first frame region 510 may have different geometric shapes, positions and/or amounts.

In the foregoing embodiment, the image intermediary apparatus 130 may display a first image based on the first image signal of the first external electronic apparatus on the interactive display apparatus 110, and may also convert the interactive position information corresponding to the interactive event that occurs on the interactive display apparatus 110 into the coordinate matching the resolution information of the first external electronic apparatus, so that operation corresponding to the interactive event may be executed on the first external electronic apparatus. Because the image intermediary apparatus 130 of the invention may be connected to the external electronic apparatuses 10 to 16 at the same time through the image input interface module 250, the image intermediary apparatus 130 may perform identical or similar operation on other external electronic apparatuses different from the first external electronic apparatus, and details thereof are described below with reference to another embodiment.

Figure 6:
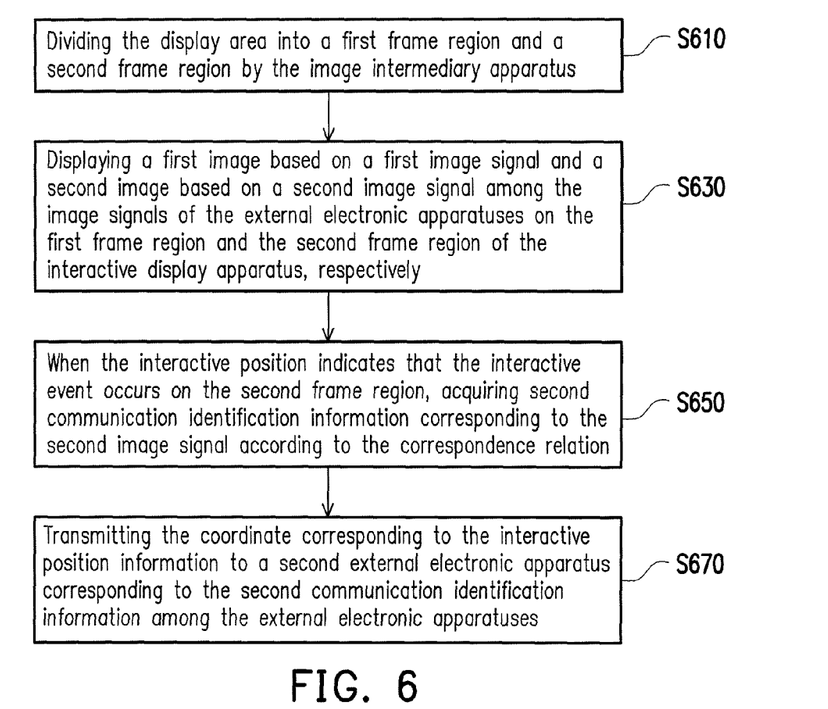
FIG. 6 is a flowchart illustrating an operation method of the interactive display system according to another embodiment of the invention.

FIG. 6 is a flowchart illustrating an operation method of the interactive display system 100 according to another embodiment of the invention. Referring to FIG. 1, FIG. 2 and FIG. 6, hereinafter, various components or modules in the interactive display system 100 and the image intermediary apparatus 130 are used to describe the operation method according to the embodiments of the invention.

Figure 7:
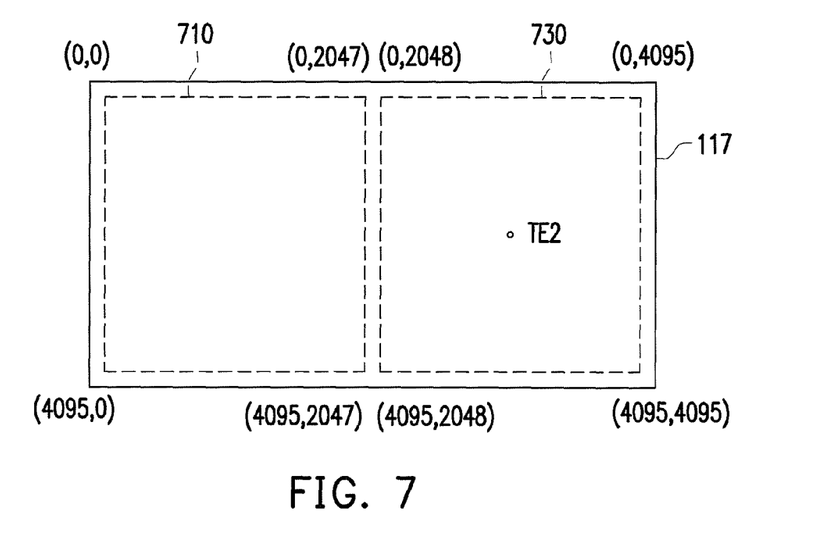
FIG. 7 is a schematic diagram of a first frame region and a second frame region according to another embodiment of the invention.

In step S610, the processing unit 270 of the image intermediary apparatus 130 divides the display area 117 into a first frame region and a second frame region. For instance, FIG. 7 is a schematic diagram of a first frame region and a second frame region according to another embodiment of the invention. Referring to FIG. 7, the display area 117 is divided into a first frame region 710 and a second frame region 730. However, geometrical shapes, positions and number of the first frame region 710 and the second frame region 730 depicted in FIG. 7 are merely examples. In other embodiments, the first frame region 710 and the second frame region 730 may have different geometrical shapes, positions and/or numbers, and the invention is not limited thereto.

Referring to FIG. 1, FIG. 2, FIG. 6 and FIG. 7, in step S630, the processing unit 270 of the image intermediary apparatus 130 displays a first image based on a first image signal and a second image based on a second image signal among the image signals of the external electronic apparatuses on the first frame region 710 and the second frame region 730 of the interactive display apparatus, respectively, through the first communication module. In the present embodiment, the processing unit 270 receives the first image signal from the first external electronic apparatus (e.g., the external electronic apparatus 10) via the first image transmission channel (e.g., the image transmission cable 251) among the image transmission channels through the image input interface module 250, and receives the second image signal from the second external electronic apparatus (e.g., the external electronic apparatus 12) via the second image transmission channel (e.g., the image transmission cable 253) through the image input interface module 250.

Description regarding how the processing unit 270 displays a first image based on a first image signal and a second image based on a second image signal respectively on the first frame region 710 and the second frame region 730 may be inferred by reference to related description of steps S320 to S330 in FIG. 3. The processing unit 270 may further record related information of projecting a first image based on a first image signal to the first frame region 710 into the field corresponding to the first external electronic apparatus (e.g., the first communication identification information and the first image identification data) in the correspondence relation and record related information of projecting a second image based on a second image signal to the second frame region 730 into the field corresponding to the second external electronic apparatus (e.g., the second communication identification information and the second image identification data) in the correspondence relation, and may record information regarding a position, a size, a range and a coordinate of each of the first frame region 710 and the second frame region 730 on the display area 117. In one embodiment, the correspondence relation for the first external electronic apparatus and the second electronic apparatus may include the fields of the first communication identification information, the first image identification data, the second communication identification information, the second image identification data, information of projecting a first image based on a first image signal on the first frame region 710, information of projecting a second image based on a second image signal on the second frame region 730, and information regarding a position, a size, a range and a coordinate of each of the first frame region 710 and the second frame region 730 on the display area 117. All of the information may be recorded in a look up table.

In step S650, when the interactive position information indicates that the interactive event occurs on the second frame region, the processing unit 270 of the image intermediary apparatus 130 acquires the second communication identification information corresponding to the second image signal having the corresponding second image displayed on the second frame region according to the correspondence relation (which may be inferred by reference to related description of step S380 in FIG. 3).

Subsequently, in step S670, the processing unit 270 of the image intermediary apparatus 130 transmits a coordinate corresponding to the interactive position information to the second external electronic apparatus (e.g., the external electronic device 12) corresponding to the second communication identification information among the external electronic apparatuses via the second wireless channel through the second communication module 230. Take FIG. 7 as an example, it is assumed that the processing unit 270 arranges the display area 117 into an area with a size of 4096*4096pixels, and each of the pixels on the display area 117 may be converted into a coordinate point on an X-Y axis coordinate. For instance, in the first frame region 710, it can be set that a most upper-left coordinate is (0,0), a most upper-right coordinate is (0,2047), a most lower-left coordinate is (4095,0) and a most lower-right coordinate is (4095,2047). In the second frame region 730, it can be set that a most upper-left coordinate is (0,2048), a most upper-right coordinate is (0,4095), a most lower-left coordinate is (4095,2048) and a most lower-right coordinate is (4095, 4095). If the resolution information in the second image identification information corresponding the second external electronic apparatus is 1080*720 while an interactive event TE2 occurs at the coordinate (2047,3071), the converted coordinate is (359,539). Subsequently, the image intermediary apparatus 130 may transmit the converted coordinate to the second external electronic apparatus, so that the second external electronic apparatus may execute interactive operations corresponding to the interactive event.

In some embodiments, when multiple interactive events occur on the same frame region or different frame regions at the same time, the image intermediary apparatus 130 may transmit the converted coordinates to the corresponding external electronic apparatus according to the same frame region or different frame regions corresponding to the different interactive events and the correspondence relations, so as to execute the interactive operations corresponding to the interactive events.

In some other embodiments, as similar to the related descriptions of FIG. 3 and FIG. 6, the image intermediary apparatus 130 may divide the display area 117 into a first frame region, a second frame region, a third frame region, and a fourth frame region, so as to display a first image based on a first image signal, a second image based on a second image signal, a third image based on a third image signal, and a fourth image based on a fourth image signal from the external electronic apparatuses 10 to 16 on the first frame region, the second frame region, the third frame region, and the fourth frame region, respectively. When the interactive event occurs on the first frame region, the second frame region, the third frame region, or the fourth frame region, the image intermediary apparatus 130 may transmit the interactive position information to the corresponding external electronic apparatuses 10 to 16 according to the correspondence relations. However, the number of the external electronic apparatuses, and the number, geometric shapes and sizes of the frame regions are merely an example, and the invention is not limited thereto.

On the other hand, the image intermediary apparatus 130 according to the embodiments of the invention may further combine the interactive operations to switch between user computers or divide the display area 117 into multiple frame regions. For instance, referring to FIG. 7, when the image intermediary apparatus 130 detects the interactive event in which the operating object moves from the first frame region 710 to the second frame region 730 in the display area 117, the image intermediary apparatus 130 may switch the first image signal having corresponding images to be displayed on the first frame region 710 of the display area 117 to the second image signal. Alternatively, when the image intermediary apparatus 130 detects the interactive event in which the operating object executes the interactive operations on three positions of the display area 117 within a specific time (e,g, two seconds, three seconds, etc.), the display area 117 may be divided into a first frame region, a second frame region and a third frame region. The image intermediary apparatus 130 is capable of providing different interactive operations and corresponding actions for switching the image signals and dividing the frame regions. In other embodiments, the image intermediary apparatus 130 may provide an operation interface to receive operations of the user in order to switch the image signals or select numbers, positions and sizes of the frame regions, however, the invention is not limited thereto.

The image intermediary apparatus of the embodiments of the invention identifies the external electronic apparatuses in order to establish the correspondence relation between the external electronic apparatuses and the image signals thereof, and displays one or more images based on the corresponding image signals respectively on one or more frame regions in the display area of the interactive display apparatus. When the interactive event occurs on a specific frame region, the image intermediary apparatus may transmit the coordinate related to the interactive position information corresponding to the interactive event to the corresponding external electronic apparatus according to the correspondence relations. Accordingly, the embodiments of the invention are capable of solving the issue regarding the length of the transmission cable to improve convenience for switching between the users and providing an interactive function of wireless transmission (images, sounds, and interactive positions) between the image intermediary apparatus and the interactive display apparatus. The embodiments of the invention may further allow the same screen to support multiple external electronic apparatuses for the interactive operations and may further combine with gesture operations for operation.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An interactive display system, configured to receive different image signals from a plurality of external electronic apparatuses and display corresponding images, comprising:
   an interactive display apparatus, comprising a display area and configured to sense an interactive event within the display area in order to acquire interactive position information; and
   an image intermediary apparatus, coupled to the interactive display apparatus via a first wireless channel in order to receive the interactive position information, wherein the image intermediary apparatus is adapted to at least divide the display area into a first frame region and identify the external electronic apparatuses in order to establish a correspondence relation between the external electronic apparatuses and the image signals of the external electronic apparatuses, and display a first image based on a first image signal among the image signals of the external electronic apparatuses on the first frame region of the interactive display apparatus, and wherein the image intermediary apparatus is adapted to acquire first communication identification information corresponding to the first image signal according to the correspondence relation and transmit a coordinate corresponding to the interactive position information to a first external electronic apparatus corresponding to the first communication identification information among the external electronic apparatuses when the interactive position information indicates that the interactive event occurs on the first frame region.

2. The interactive display system of claim 1, wherein the interactive display apparatus further comprises an interactive projection screen and a projector, wherein
   the interactive projection screen has the display area, and the projector is configured to project the first image based on the first image signal among the image signals of the external electronic apparatuses on the first frame region of the display area of the interactive projection screen;
   wherein the interactive display apparatus is configured to sense the interactive event within the display area and acquire the interactive position information.

3. The interactive display system of claim 1, wherein the first external electronic apparatus is adapted to transmit the first image signal to the image intermediary apparatus via a first image transmission channel, and the image intermediary apparatus is adapted to transmit the coordinate to the first external electronic apparatus by using the first communication identification information via a second wireless channel different from the first image transmission channel.

4. The interactive display system of claim 3, wherein the image intermediary apparatus is adapted to transmit first image identification data to the first external electronic apparatus via the first image transmission channel and receive a plurality of packets transmitted back from the first external electronic apparatus via the second wireless channel, wherein at least one of the packets contains the first communication identification information of the first external electronic apparatus and the first image identification data received by the first external electronic apparatus, and the image intermediary apparatus is adapted to record the first communication identification information and the first image identification data into the correspondence relation.

5. The interactive display system of claim 3, wherein the image intermediary apparatus is configured to divide the display area into the first frame region and a second frame region and display the first image based on the first image signal and a second image based on a second image signal among the image signals of the external electronic apparatuses on the first frame region and the second frame region of the interactive display apparatus, respectively, and the image intermediary apparatus is adapted to acquire second communication identification information corresponding to the second image signal according to the correspondence relation and transmit the coordinate corresponding to the interactive position information to a second external electronic apparatus corresponding to the second communication identification information among the external electronic apparatuses when the interactive position information indicates that the interactive event occurs on the second frame region.

6. The interactive display system of claim 5, wherein the second external electronic apparatus is adapted to transmit the second image signal to the image intermediary apparatus via a second image transmission channel, and the image intermediary apparatus is adapted to transmit the coordinate to the second external electronic apparatus by using the second communication identification information via the second wireless channel.

7. The interactive display system of claim 6, wherein the image intermediary apparatus is adapted to transmit second image identification data to the second external electronic apparatus via the second image transmission channel and receive a plurality of packets transmitted back from the second external electronic apparatus via the second wireless channel, wherein at least one of the packets contains the second communication identification information of the second external electronic apparatus and the second image identification data received by the second external electronic apparatus, and the image intermediary apparatus is adapted to record the second communication identification information and the second image identification data into the correspondence relation.

8. The interactive display system of claim 6, wherein the first image transmission channel comprises a first image transmission cable, the second image transmission channel comprises a second image transmission cable, the first wireless channel comprises a first wireless local area network, and the second wireless channel comprises a second wireless local area network.

9. The interactive display system of claim 7, wherein the first image identification data comprises a machine name field and a resolution field, the second image identification data comprises another machine name field and another resolution field, the machine name fields record machine names of the external electronic apparatuses, and the resolution fields record resolution information of the external electronic apparatuses.

10. The interactive display system of claim 9, wherein the image intermediary apparatus is adapted to convert the coordinate according to the resolution information and transmit the converted coordinate to the first external electronic apparatus or the second external electronic apparatus based on the interactive position information.

11. An operation method of an interactive display system, the interactive display system comprising an interactive display apparatus and an image intermediary apparatus, and the operation method comprising:
- receiving different image signals from a plurality of external electronic apparatuses and identifying the external electronic apparatuses by the image intermediary apparatus in order to establish a correspondence relation between the external electronic apparatuses and the image signals of the external electronic apparatuses;
- at least dividing a display area of the interactive display apparatus into a first frame region by the image intermediary apparatus;
- displaying a first image based on a first image signal among the image signals of the external electronic apparatuses on the first frame region by the image intermediary apparatus;
- sensing an interactive event within the display area by the interactive display apparatus in order to acquire interactive position information;
- transmitting the interactive position information to the image intermediary apparatus via a first wireless channel by the interactive display apparatus;
- acquiring first communication identification information corresponding to the first image signal by the image intermediary apparatus according to the correspondence relation when the interactive position information indicates that the interactive event occurs on the first frame region; and
- transmitting a coordinate corresponding to the interactive position information to a first external electronic apparatus corresponding to the first communication identification information among the external electronic apparatuses by the image intermediary apparatus.

12. The operation method of the interactive display system of claim 11, wherein the interactive display apparatus is configured to sense the interactive event within the display area and acquire the interactive position information and comprises an interactive projection screen and a projector, the interactive projection screen has the display area, and the projector is configured to project the first image based on the first image signal among the image signals of the external electronic apparatuses on the first frame region of the display area of the interactive projection screen.

13. The operation method of the interactive display system of claim 11, wherein the first external electronic apparatus is adapted to transmit the first image signal to the image intermediary apparatus via a first image transmission channel, and the image intermediary apparatus is adapted to transmit the coordinate to the first external electronic apparatus by using the first communication identification information via a second wireless channel different from the first image transmission channel.

14. The operation method of the interactive display system of claim 13, wherein the step of identifying the external electronic apparatuses comprises:
- transmitting first image identification data to the first external electronic apparatus via the first image transmission channel by the image intermediary apparatus;
- receiving a plurality of packets transmitted back from the first external electronic apparatus via the second wireless channel by the image intermediary apparatus, wherein at least one of the packets contains the first communication identification information of the first external electronic apparatus and the first image identification data received by the first external electronic apparatus; and
- recording the first communication identification information and the first image identification data contained by the packets into the correspondence relation by the image intermediary apparatus.

15. The operation method of the interactive display system of claim 13, further comprising:
- dividing the display area into the first frame region and a second frame region by the image intermediary apparatus;
- displaying the first image based on the first image signal and a second image based on a second image signal among the image signals of the external electronic apparatuses on the first frame region and the second frame region of the interactive display apparatus, respectively, by the image intermediary apparatus;
- acquiring second communication identification information corresponding to the second image signal by the image intermediary apparatus according to the correspondence relation when the interactive position information indicates that the interactive event occurs on the second frame region; and
- transmitting the coordinate corresponding to the interactive position information to a second external electronic apparatus corresponding to the second communication identification information among the external electronic apparatuses.

16. The operation method of the interactive display system of claim 15, wherein the second external electronic apparatus is adapted to transmit the second image signal to the image intermediary apparatus via a second image transmission channel, and the image intermediary apparatus is adapted to transmit the coordinate to the second external electronic apparatus by using the second communication identification information via the second wireless channel.

17. The operation method of the interactive display system of claim 16, wherein the first image transmission channel comprises a first image transmission cable, the second image transmission channel comprises a second image transmission cable, the first wireless channel comprises a first wireless local area network, and the second wireless channel comprises a second wireless local area network.

18. The operation method of the interactive display system of claim 16, wherein the step of identifying the external electronic apparatuses further comprises:
- transmitting second image identification data to the second external electronic apparatus via the second image transmission channel by the image intermediary apparatus;
- receiving a plurality of packets transmitted back from the second external electronic apparatus via the second wireless channel by the image intermediary apparatus, wherein at least one of the packets contains the second communication identification information of the second external electronic apparatus and the second image identification data received by the second external electronic apparatus; and
- recording the second communication identification information and the second image identification data contained by the packets into the correspondence relation by the image intermediary apparatus.

19. The operation method of the interactive display system of claim 18, wherein the first image identification data comprises a machine name field and a resolution field, the second image identification data comprises another machine name field and another resolution field, the machine name fields record machine names of the external electronic apparatuses, and the resolution fields record resolution information of the external electronic apparatuses.

20. The operation method of the interactive display system of claim 19, further comprising:
converting the coordinate by the image intermediary apparatus according to the resolution information, and transmitting the converted coordinate to the first external electronic apparatus or the second external electronic apparatus based on the interactive position information.

21. An image intermediary apparatus, configured to receive different image signals from a plurality of external electronic apparatuses and respectively display images based on image signals of the external electronic apparatuses on an interactive display apparatus, comprising:
a first communication module, coupled to the interactive display apparatus via a first wireless channel in order to receive interactive position information,
a second communication module, coupled to the external electronic apparatuses via a second wireless channel,
an image input interface module, configured to be coupled to the external electronic apparatuses respectively via a plurality of image transmission channels different from the second wireless channel in order to receive the image signals, and
a processing unit, coupled to the first communication module, the second communication module, and the image input interface module, wherein the processing unit is adapted to at least divide a display area of the interactive display apparatus into a first frame region, identify the external electronic apparatuses through the image input interface module in order to establish a correspondence relation between the external electronic apparatuses and the image signals of the external electronic apparatuses, and display a first image based on a first image signal among the image signals on the first frame region of the interactive display apparatus via the first wireless channel through the first communication module, and wherein when the interactive position information indicates that an interactive event within the display area sensed by the interactive display apparatus occurs on the first frame region, the processing unit is adapted to acquire first communication identification information corresponding to the first image signal according to the correspondence relation, and transmit a coordinate corresponding to the interactive position information to a first external electronic apparatus corresponding to the first communication identification information among the external electronic apparatuses via the second wireless channel through the second communication module.

22. The image intermediary apparatus of claim 21, wherein the processing unit is adapted to receive the first image signal from the first external electronic apparatus via a first image transmission channel among the image transmission channels through the image input interface module, and the processing unit is adapted to transmit the coordinate to the first external electronic apparatus by using the first communication identification information via the second wireless channel different from the first image transmission channel through the second communication module.

23. The image intermediary apparatus of claim 22, wherein the processing unit is adapted to transmit first image identification data to the first external electronic apparatus via the first image transmission channel through the image input interface module and receive a plurality of packets transmitted back from the first external electronic apparatus via the second wireless channel through the second communication module, and wherein at least one of the packets contains the first communication identification information of the first external electronic apparatus and the first image identification data received by the first external electronic apparatus, and the processing unit is adapted to record the first communication identification information and the first image identification data into the correspondence relation.

24. The image intermediary apparatus of claim 22, wherein the processing unit is configured to divide the display area into the first frame region and a second frame region, and display the first image based on the first image signal and a second image based on a second image signal among the image signals of the external electronic apparatuses on the first frame region and the second frame region of the interactive display apparatus, respectively, via the first wireless channel through the first communication module, and the processing unit is adapted to acquire second communication identification information corresponding to the second image signal according to the correspondence relation and transmit the coordinate corresponding to the interactive position information to a second external electronic apparatus corresponding to the second communication identification information among the external electronic apparatuses via the second wireless channel through the second communication module when the interactive position information indicates that the interactive event occurs on the second frame region.

25. The image intermediary apparatus of claim 24, wherein the processing unit is adapted to receive the second image signal from the second external electronic apparatus via a second image transmission channel through the image input interface module, and the processing unit is adapted to transmit the coordinate to the second external electronic apparatus by using the second communication identification information via the second wireless channel through the second communication module.

26. The image intermediary apparatus of claim 25, wherein the processing unit is adapted to transmit second image identification data to the second external electronic apparatus via the second image transmission channel through the image input interface module and receive a plurality of packets transmitted back from the second external electronic apparatus via the second wireless channel through the second communication module, wherein at least one of the packets contains the second communication identification information of the second external electronic apparatus and the second image identification data received by the second external electronic apparatus, and the processing unit is adapted to record the second communication identification information and the second image identification data into the correspondence relation.

27. The image intermediary apparatus of claim 25, wherein the first image transmission channel comprises a first image transmission cable, the second image transmission channel comprises a second image transmission cable, the first wireless channel comprises a first wireless local area network, and the second wireless channel comprises a second wireless local area network.

28. The image intermediary apparatus of claim 25, wherein the first image identification data comprises a machine name field and a resolution field, the second image identification data comprises another machine name field and another resolution field, the machine name fields record machine names of the external electronic apparatuses, and the resolution fields record resolution information of the external electronic apparatuses.

29. The image intermediary apparatus of claim 28, wherein the processing unit is adapted to convert the coordinate according to the resolution information and transmit the converted coordinate to the first external electronic apparatus or the second external electronic apparatus via the second wireless channel through the second communication module based on the interactive position information.

* * * * *